(12) United States Patent
Fukuda et al.

(10) Patent No.: US 12,122,899 B2
(45) Date of Patent: *Oct. 22, 2024

(54) COMPOSITION, THERMOPLASTIC RESIN COMPOSITION USING SAME, AND MOLDED ARTICLE OF SAME

(71) Applicant: ADEKA CORPORATION, Tokyo (JP)

(72) Inventors: Takuya Fukuda, Saitama (JP); Yuri Yokota, Saitama (JP); Hiroaki Mizushima, Saitama (JP); Takahiro Horikoshi, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,990

(22) Filed: Jan. 4, 2023

(65) Prior Publication Data

US 2023/0143936 A1 May 11, 2023

Related U.S. Application Data

(63) Continuation of application No. 16/643,260, filed as application No. PCT/JP2018/032252 on Aug. 30, 2018, now Pat. No. 11,578,188.

(30) Foreign Application Priority Data

Aug. 31, 2017 (JP) ................. 2017-168027

(51) Int. Cl.
C08K 5/527 (2006.01)
C08K 5/00 (2006.01)
C08K 5/098 (2006.01)
C08L 23/02 (2006.01)

(52) U.S. Cl.
CPC .............. C08K 5/527 (2013.01); C08K 5/098 (2013.01); C08L 23/02 (2013.01); C08K 5/0083 (2013.01); C08K 2201/014 (2013.01)

(58) Field of Classification Search
CPC ... C08K 5/098; C08K 5/527; C08K 2201/014
USPC ................................................. 524/119, 120
See application file for complete search history.

(56) References Cited

U.S. PATENT DOCUMENTS

| | | |
|---|---|---|
| 5,342,868 A | 8/1994 | Kimura et al. |
| 10,800,800 B2 | 10/2020 | Fukuda |
| 11,578,188 B2 * | 2/2023 | Fukuda ................ C08L 101/00 |
| 2005/0197456 A1 | 9/2005 | Nicolini et al. |
| 2012/0190797 A1 | 7/2012 | Kristiansen et al. |
| 2013/0037743 A1 | 2/2013 | Zhao |
| 2013/0237652 A1 | 9/2013 | Kulshreshtha et al. |
| 2018/0072931 A1 | 3/2018 | Cui et al. |

FOREIGN PATENT DOCUMENTS

| | | |
|---|---|---|
| CN | 101265347 A | 9/2008 |
| CN | 101845171 A | 9/2010 |
| CN | 102344609 A | 2/2012 |

(Continued)

OTHER PUBLICATIONS

Basov et al., Quality Control of Polymeric Materials, ed. by V. A. Braginskiy, second revised edition, Leningrad, Chemistry Publishing House, 1990, 112 pages.
Chinese Office Action and Search Report for Chinese Application No. 201880055914.4, dated Mar. 11, 2021.
English translation of International Preliminary Report on Patentability issued Oct. 18, 2019, in PCT/JP2018/032252.
Espacenet translation of CN 101265347 (2008, 6 pages).
Extended European Search Report issued May 6, 2021, in European Patent Application No. 18851733.8.
Google patent translation of CN 101254347 (2008, 10 pages).
Google patents translation of JP 2013133364 (2013, 6 pages).

(Continued)

*Primary Examiner* — Brieann R Johnston
(74) *Attorney, Agent, or Firm* — Birch, Stewart, Kolasch & Birch, LLP

(57) ABSTRACT

Provided are: a composition that can impart a thermoplastic resin with excellent transparency and physical properties; a thermoplastic resin composition containing the same; and a molded article thereof. The composition contains: (A) a cyclic organophosphate aluminum salt represented by Formula (1) below, wherein $R^1$ to $R^4$ each independently represent a hydrogen atom or a linear or branched alkyl group having 1 to 9 carbon atoms and $R^5$ represents an alkylidene group having 1 to 4 carbon atoms; (B) a sodium carboxylate; and (C) a fatty acid metal salt represented by Formula (2) below, wherein $R^6$ represents a group which is introduced to an aliphatic organic acid having 10 to 30 carbon atoms and $M^1$ represents lithium or potassium, wherein the following ranges are satisfied in terms of molar ratio: (C)/(B)=0.30 to 5.00, and (A)/{(B)+(C)}=0.15 to 0.70.

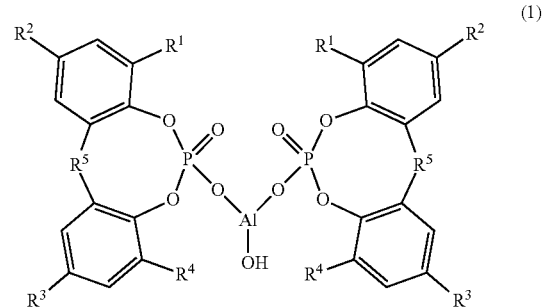

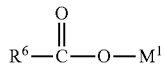

2 Claims, No Drawings

(56) References Cited

FOREIGN PATENT DOCUMENTS

| | | |
|---|---|---|
| CN | 102408626 A | 4/2012 |
| CN | 102807685 A | 12/2012 |
| CN | 107429048 A | 12/2017 |
| JP | 1-129050 A | 5/1989 |
| JP | 5-156078 A | 6/1993 |
| JP | 8-120116 A | 5/1996 |
| JP | 10-298367 A | 11/1998 |
| JP | 2003-313444 A | 11/2003 |
| JP | 2007-517122 A | 6/2007 |
| JP | 2011-219518 A | 11/2011 |
| JP | 2013-505309 A | 2/2013 |
| JP | 2013-133364 A | 7/2013 |
| RU | 2 534 611 C2 | 11/2014 |

OTHER PUBLICATIONS

International Preliminary Report on Patentability issued in PCT/JP2018/032252 (PCT/IPEA/409), completed on Oct. 18, 2019.
International Search Report issued in PCT/JP2018/032252 (PCT/ISA/210), dated Nov. 27, 2018.
Office Action issued Jul. 21, 2022, in RU 2020112423.
Written Opinion of the International Searching Authority issued in PCT/JP2018/032252 (PCT/ISA/237), dated Nov. 27, 2018.

* cited by examiner

COMPOSITION, THERMOPLASTIC RESIN COMPOSITION USING SAME, AND MOLDED ARTICLE OF SAME

CROSS-REFERENCE TO RELATED APPLICATIONS

This application is a continuation of U.S. application Ser. No. 16/643,260 that was filed on Feb. 28, 2020, which is the National Phase of PCT International Application No. PCT/JP2018/032252, filed on Aug. 30, 2018, which claims priority under 35 U.S.C. § 119(a) to Patent Application No. 2017-168027, filed in Japan on Aug. 31, 2017, all of which are hereby expressly incorporated by reference into the present application.

TECHNICAL FIELD

The present invention relates to a composition, a thermoplastic resin composition containing the same, and a molded article thereof. More particularly, the present invention relates to: a composition that can impart a thermoplastic resin with excellent transparency and physical properties; a thermoplastic resin composition containing the same; and a molded article thereof.

BACKGROUND ART

Thermoplastic resins are, depending on their physical properties including moldability and low specific gravity, widely utilized in various molded articles, such as building materials, automobile materials, materials of household electric appliances and electronics, fiber materials, packaging materials, agricultural materials, housing materials of household electric appliances, household miscellaneous goods, films, sheets, and structural components. Particularly, polyolefin-based resins, such as polyethylene, polypropylene and polybutene-1, advantageously have excellent moldability, heat resistance, mechanical characteristics, low specific gravity and the like; therefore, they are widely utilized in films, sheets, and various molded articles (e.g., structural components).

However, polyolefin-based resins have drawbacks in that they have poor molding cycle characteristics due to their low post-molding crystallization rates, and that they are insufficient in terms of transparency and strength due to the generation of large crystals caused by the progress of crystallization after heat-molding. These drawbacks are all attributed to the crystallinity of polyolefin-based resins, and it is known that the above-described problems can be solved by increasing the crystallization temperature of each polyolefin-based resin and thereby allowing the polyolefin-based resin to rapidly generate fine crystals.

It is known to add a nucleating agent for this purpose, and examples of known nucleating agents include metal carboxylates, such as sodium benzoate, 4-tert-butylbenzoate aluminum salt, sodium adipate, and 2-sodium-bicyclo[2.2.1]heptane-2,3-dicarboxylate; cyclic organophosphate metal salts, such as sodium-bis(4-tert-butylphenyl)phosphate, sodium-2,2'-methylene-bis(4,6-di-tert-butylphenyl)phosphate, and lithium-2,2'-methylene-bis(4,6-di-tert-butylphenyl)phosphate; polyhydric alcohol derivatives, such as dibenzylidene sorbitol, bis(methylbenzylidene)sorbitol, bis(3,4-dimethylbenzylidene)sorbitol, bis(p-ethylbenzylidene)sorbitol, and bis(dimethylbenzylidene)sorbitol; and amide compounds, such as N,N',N''-tris[2-methylcyclohexyl]-1,2,3-propane tricarboxamide, N,N',N''-tricyclohexyl-1,3,5-benzene tricarboxamide, N,N-dicyclohexyl-naphthalene dicarboxamide, and 1,3,5-tri(2,2-dimethylpropaneamide) benzene.

Among these compounds, cyclic organophosphate metal salts are known as nucleating agents that have a high effect of improving the transparency and the physical properties of polyolefin-based resins. For example, in Patent Document 1, it is proposed to add a basic aluminum salt of a cyclic organophosphate and an alkali metal compound, such as an alkali metal carboxylate, an alkali metal β-diketonate or an alkali metal β-ketoacetate, to a polyolefin or polyethylene terephthalate. In addition, Patent Document 2 proposes a nucleator composition containing a basic multivalent metal salt of a cyclic organophosphate and an alkali metal salt compound, and it is reported that this nucleator composition improves the transparency and the impact strength of polyolefins.

Further, Patent Document 3 describes that, as a nucleating agent, one or a mixture of sodium 2,2'-methylene-bis(4,6-di-tert-butylphenoxy)phosphate, sodium di(4-tert-butylphenoxy)phosphate, aluminum hydroxybis[2,2-methylene-bis(4,6-di-tert-butylphenoxy)phosphate], bis(2-alkyl,4-alkylphenoxy)phosphate, sodium bicyclo[2,2,1]heptane dicarboxylate and calcium bicyclo[2,2,1]heptane dicarboxylate is preferred, and resin compositions in which such a nucleating agent and sodium benzoate are added are described in the section of Examples. Moreover, Patent Document 4 proposes a nucleator composition obtained by mixing aluminum hydroxy p-tert-butylbenzoate and/or sodium benzoate with aluminum hydroxybis[2,2-methylene-bis(4,6-di-tert-butylphenoxy)phosphate]. Furthermore, Patent Document 5 proposes a polypropylene clarifying agent that contains a multivalent metal salt substituting a diaryl phosphoric acid and an alkali metal salt of a monobasic fatty acid.

RELATED ART DOCUMENTS

Patent Documents

[Patent Document 1] JPH08-120116A
[Patent Document 2] JPH 05-156078A
[Patent Document 3] CN102344609B
[Patent Document 4] CN101845171A
[Patent Document 5] CN101265347B

SUMMARY OF THE INVENTION

Problems to be Solved by the Invention

However, although combinations of aluminum hydroxybis[2,2'-methylene-bis(4,6-di-tert-butylphenyl) phosphate] and sodium stearate are described in Patent Documents 1 and 2, their nucleating effects are still insufficient, and a further improvement is thus demanded. In addition, although Patent Document 3 shows that the above-described resin compositions improve the creep resistance, incorporation of aluminum hydroxybis[2,2-methylene-bis(4,6-di-tert-butylphenoxy)phosphate] is not examined therein, and the transparency and the physical properties are not adequately evaluated. Further, Patent Document 4 describes compositions obtained by blending sodium benzoate or a combination of sodium benzoate and aluminum hydroxy p-tert-hydroxybenzoate with aluminum hydroxybis [2,2-methylene-bis(4,6-di-tert-butylphenoxy)phosphate]; however, there is no further mention thereto and, since incorporation of these compositions into a resin is not evaluated, there is still room for investigation with regard to their effects on the transparency and the physical properties. Furthermore Patent Document 5 describes resin compositions that contain aluminum hydroxybis[2,2-methylene-bis (4,6-di-tert-butylphenoxy)phosphate], a sodium carboxylate such as sodium stearate or sodium rosinate, and/or an alkali metal salt of a monobasic fatty acid, such as lithium hydroxystearate; however, the effects of these resin compositions are not satisfactory, and a further improvement is thus demanded.

In view of the above, an object of the present invention is to provide: a composition that can impart a thermoplastic resin with excellent transparency and physical properties; a thermoplastic resin composition containing the same; and a molded article thereof.

Means for Solving the Problems

The present inventors intensively studied to solve the above-described problems and consequently discovered that the above-described object can be achieved by using a sodium carboxylate in combination with a fatty acid lithium salt or a fatty acid potassium salt at a specific ratio with respect to a cyclic organophosphate aluminum salt, thereby completing the present invention.

That is, the composition of the present invention is a composition containing:

(A) a cyclic organophosphate aluminum salt represented by the following Formula (1):

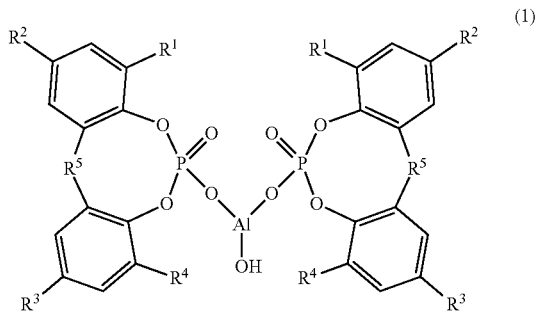

(1)

wherein $R^1$ to $R^4$ each independently represent a hydrogen atom or a linear or branched alkyl group having 1 to 9 carbon atoms, and $R^5$ represents an alkylidene group having 1 to 4 carbon atoms;

(B) a sodium carboxylate; and (C) a fatty acid metal salt represented by the following Formula (2):

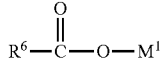

(2)

wherein $R^6$ represents a group which is introduced to an aliphatic organic acid having 10 to 30 carbon atoms, and $M^1$ represents lithium or potassium, the composition being characterized in that:

a molar ratio of the (C) fatty acid metal salt represented by Formula (2) and the (B) sodium-fatty acid, (C)/(B), is in a range of 0.30 to 5.00, and a molar ratio of the (A) cyclic organophosphate aluminum salt represented by Formula (1), the (B) sodium-fatty acid and the (C) fatty acid metal salt represented by Formula (2), (A)/{(B)+(C)}, is in a range of 0.15 to 0.70.

In the composition of the present invention, the sodium carboxylate is preferably a sodium aromatic carboxylate or a sodium-fatty acid.

A thermoplastic resin composition of the present invention is characterized by containing the composition of the present invention such that the (A) cyclic organophosphate aluminum salt represented by Formula (1) is contained in an amount of 0.001 to 10 parts by mass with respect to 100 parts by mass of a thermoplastic resin.

In the thermoplastic resin composition of the present invention, the thermoplastic resin is preferably a polyolefin-based resin.

A molded article of the present invention is characterized by containing the thermoplastic resin composition of the present invention.

Effects of the Invention

According to the present invention, a composition that can impart a thermoplastic resin, particularly a polyolefin-based resin, with excellent transparency and physical properties; a thermoplastic resin composition containing the same, and a molded article thereof can be provided.

MODE FOR CARRYING OUT THE INVENTION

Embodiments of the present invention will now be described in detail. A composition of the present invention contains: (A) a cyclic organophosphate aluminum salt represented by the following Formula (1):

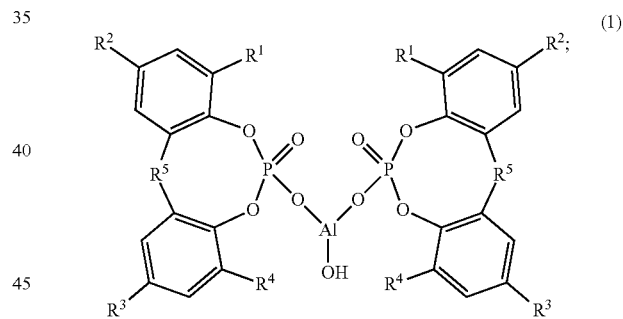

(1)

(B) a sodium carboxylate; and (C) a fatty acid metal salt represented by the following Formula (2):

(2)

First, the (A) cyclic organophosphate aluminum salt represented by Formula (1) (hereinafter, also referred to as "component (A)") will be described. In Formula (1), $R^1$ to $R^4$ each independently represent a hydrogen atom or a linear or branched alkyl group having 1 to 9 carbon atoms, and $R^5$ represents an alkylidene group having 1 to 4 carbon atoms.

Examples of the linear or branched alkyl group having 1 to 9 carbon atoms which is represented by $R^1$ to $R^4$ in Formula (1) include a methyl group, an ethyl group, a propyl group, an isopropyl group, a butyl group, a sec-butyl group, a tert-butyl group, an isobutyl group, an amyl group, a tert-amyl group, a hexyl group, a heptyl group, an octyl group, an isooctyl group, a tert-octyl group, a 2-ethylhexyl group, a nonyl group and an isononyl group, among which a tert-butyl group is particularly preferred in the composition of the present invention.

Examples of the alkylidene group having 1 to 4 carbon atoms which is represented by $R^5$ in Formula (1) include a methylene group, an ethylidene group, a propylidene group and a butylidene group, among which a methylene group is preferred in the composition of the present invention.

Examples of a method of producing the cyclic organophosphate aluminum salt represented by Formula (1) according to the composition of the present invention include a method of allowing a cyclic phosphoric acid having a corresponding structure to react with an aluminum compound, such as aluminum hydroxide, aluminum oxide, aluminum halide, aluminum sulfate, aluminum nitrate or an aluminum alkoxide compound, using a reactant such as a basic compound that is used as required; a method of allowing an alkali metal salt of a cyclic phosphate having a corresponding structure to undergo a salt exchange reaction with an aluminum compound, such as aluminum hydroxide, aluminum oxide, aluminum halide, aluminum sulfate, aluminum nitrate or an aluminum alkoxide compound, using a reactant that is used as required; and a method of generating a cyclic phosphoric acid by hydrolysis using cyclic phosphorus oxychloride as a starting material and subsequently allowing the thus generated cyclic phosphoric acid to react with a metal compound.

Specific examples of the compound represented by Formula (1) include compounds below. However, in the composition of the present invention, the component (A) is not restricted thereto.

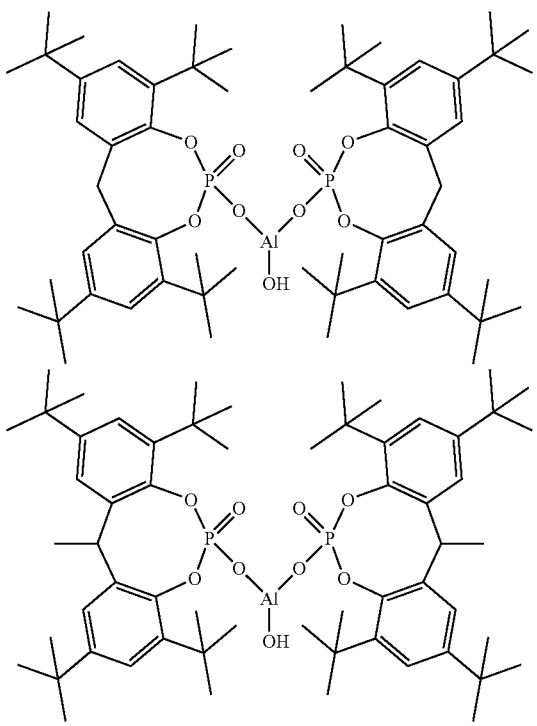

In the composition of the present invention, the component (A) is not restricted in terms of the particle conditions such as particle size and particle size distribution; however, it is known that the dispersibility of the compound (A) into a resin is improved in case the particle size thereof is small, therefore the volume-average particle size is preferably 100 μm or smaller, more preferably 30 μm or smaller, still more preferably 20 μm or smaller. The term "volume-average particle size" used herein refers to a volume-weighted average particle size determined by a laser diffraction-scattering particle size analyzer (MICROTRAC MT3000II, manufactured by MicrotracBEL Corp.).

In the composition of the present invention, aluminum hydroxybis[2,2'-methylene-bis(4,6-di-tert-butylphenyl) phosphate] is preferred since it can impart a polyolefin-based resin with most favorable transparency and physical properties.

The composition of the present invention contains the component (A) in a range of preferably 40 to 75% by mass, more preferably 45 to 70% by mass. When the content of the component (A) is less than 40% by mass or greater than 75% by mass, the nucleating effect may be poor and the thermal stability may be deteriorated.

The amount of the component (A) to be added to a thermoplastic resin is 0.001 to 10 parts by mass, preferably 0.006 to 5 parts by mass, with respect to 100 parts by mass of the thermoplastic resin. When the amount of the component (A) is less than 0.001 parts by mass, a nucleating effect may not be obtained, whereas an amount of greater than 10 parts by mass makes it difficult to disperse the component (A) into the thermoplastic resin, and the physical properties and the external appearance of the resulting molded article may consequently be adversely affected.

Next, the (B) sodium carboxylate (hereinafter, also referred to as "component (B)") will be described. In the composition of the present invention, the (B) sodium carboxylate is, for example, a sodium aromatic carboxylate or a sodium-fatty acid.

Examples of an aromatic carboxylic acid include benzoic acid, tert-butylbenzoic acid, methoxybenzoic acid, dimethoxybenzoic acid, trimethoxybenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, and thenoic acid. In the composition of the present invention, the aromatic carboxylic acid is preferably benzoic acid or tert-butylbenzoic acid, since this makes the effects of the present invention prominent.

Examples of the fatty acid of the sodium-fatty acid include fatty acids in which an alkyl or alkenyl group having 9 to 29 carbon atoms is introduced along with two or more unsaturated bonds, and a hydrogen atom of such a fatty acid may be substituted with a hydroxy group, and the fatty acid may be branched as well. Specific examples of the fatty acid include saturated fatty acids, such as capric acid, 2-ethylhexanoic acid, undecylic acid, lauric acid, tridecylic acid, myristic acid, pentadecylic acid, palmitic acid, margaric acid, stearic acid, 12-hydroxystearic acid, nonadecylic acid, arachidic acid, heneicosylic acid, behenic acid, tricosylic acid, lignoceric acid, cerotic acid, montanoic acid, and melissic acid; and linear unsaturated fatty acids, such as 4-decenoic acid, 4-dodecenoic acid, palmitoleic acid, α-linolenic acid, linoleic acid, γ-linolenic acid, stearidonic acid, petroselinic acid, oleic acid, elaidic acid, vaccenic acid, eicosapentaenoic acid, docosapentaenoic acid, and docosahexaenoic acid. In the composition of the present invention, a fatty acid having 10 to 21 carbon atoms is preferred, and a fatty acid having 12 to 18 carbon atoms is more preferred. Specifically, the fatty acid is particularly preferably lauric acid, myristic acid, palmitic acid, stearic acid, 12-hydroxystearic acid, oleic acid, or linoleic acid, since this makes the effects of the present invention prominent.

Next, the (C) fatty acid metal salt represented by Formula (2) (hereinafter, also referred to as "component (C)") will be described. In Formula (2), $R^1$ represents a group having 10 to 30 carbon atoms which is introduced to an aliphatic organic acid, and $M^1$ represents lithium or potassium.

In Formula (2), examples of the group which is introduced to an aliphatic organic acid having 10 to 30 carbon atoms and represented by $R^6$ include hydrocarbon groups in which an alkyl group or alkenyl group having 9 to 29 carbon atoms is introduced along with two or more unsaturated bonds. The alkyl group or alkenyl group may be branched, and hydrogen atoms of the hydrocarbon groups may be substituted with hydroxy groups. Specific examples of the (C) fatty acid metal salt include lithium salts and potassium salts of the fatty acids that are exemplified above for sodium carboxylate.

In the composition of the present invention, the fatty acid of the component (C) is preferably a fatty acid having 10 to 21 carbon atoms, more preferably a fatty acid having 12 to 18 carbon atoms. Specifically, the fatty acid of the component (C) is particularly preferably lauric acid, myristic acid, palmitic acid, stearic acid, 12-hydroxystearic acid, oleic acid, or linoleic acid, since this makes the effects of the present invention prominent.

In the composition of the present invention, the molar ratio of the components (B) and (C), (C)/(B), is in a range of preferably 0.30 to 5.00, more preferably 0.35 to 2.50. By controlling the molar ratio to be in this range, the composition of the present invention is enabled to greatly improve the physical properties and the transparency of a thermoplastic resin, particularly a polyolefin-based resin.

In the composition of the present invention, a total amount of the components (B) and (C) in the composition is in a range of preferably 25 to 60% by mass, more preferably 30 to 55% by mass. When the total amount of the components (B) and (C) is less than 25% by mass or greater than 60% by mass, the nucleating effect may be poor, and the composition is more likely to be discolored by heat.

In the composition of the present invention, the molar ratio of the components (A), (B) and (C), (A)/{(B)+(C)}, is in a range of 0.15 to 0.70, and the molar ratio is particularly preferably in a range of 0.25 to 0.65 since an excellent crystallization-promoting effect is thereby attained.

Next, the thermoplastic resin composition of the present invention will be described.

Resins that can be used in the thermoplastic resin composition of the present invention are not restricted as long as they are thermoplastic resins; however, from the standpoint of making the effects of the present invention prominent, a polyolefin-based resin, a styrene-based resin, a polyester-based resin, a polyether-based resin, a polycarbonate-based resin, a polyamide-based resin, or a halogen-containing resin is preferably used, and a polyolefin-based resin is more preferably used.

Examples of the polyolefin-based resin include α-olefin polymers, such as polyethylenes, low-density polyethylenes, linear low-density polyethylenes, high-density polyethylenes, cross-linked polyethylenes, ultrahigh-molecular-weight polyethylenes, polypropylenes, homopolypropylenes, random copolymer polypropylenes, block copolymer polypropylenes, isotactic polypropylenes, syndiotactic polypropylenes, hemi-isotactic polypropylenes, polybutenes, cycloolefin polymers, stereo block polypropylenes, poly-3-methyl-1-butenes, poly-3-methyl-1-pentenes, and poly-4-methyl-1-pentenes; α-olefin copolymers, such as ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers, and ethylene-vinyl acetate copolymers; polyfluoroolefins; and polyolefin-based thermoplastic elastomers. The polyolefin-based resin may be a copolymer of two or more of these resins.

Examples of the styrene-based resin include vinyl group-containing aromatic hydrocarbon homopolymers, and copolymers of a vinyl group-containing aromatic hydrocarbon and other monomer(s) (e.g., maleic anhydride, phenylmaleimide, (meth)acrylate, butadiene and/or (meth)acrylonitrile), for example, thermoplastic resins, such as polystyrene (PS) resins, high-impact polystyrenes (HIPS), acrylonitrile-styrene (AS)resins, acrylonitrile-butadiene-styrene (ABS) resins, methyl methacrylate-butadiene-styrene (MBS) resins, heat-resistant ABS resins, acrylate-styrene-acrylonitrile (ASA) resins, acrylonitrile-acrylic rubber-styrene (AAS) resins, styrene-maleic anhydride (SMA) resins, methacrylate-styrene (MS) resins, styrene-isoprene-styrene (SIS) resins, acrylonitrile-ethylene-propylene rubber-styrene (AES) resins, styrene-butadiene-butylene-styrene (SBBS) resins, and methyl methacrylate-acrylonitrile-butadiene-styrene (MABS) resins; and hydrogenated styrene-based elastomer resins obtained by hydrogenation of the double bond of butadiene or isoprene in the above-described resins, such as styrene-ethylene-butylene-styrene (SEBS) resins, styrene-ethylene-propylene-styrene (SEPS) resins, styrene-ethylene-propylene (SEP) resins, and styrene-ethylene-ethylene-propylene-styrene (SEEPS) resins.

Examples of the polyester-based resin include aromatic polyesters, such as polyalkylene terephthalates (e.g., polyethylene terephthalate, polybutylene terephthalate, and polycyclohexane dimethylene terephthalate) and polyalkylene naphthalates (e.g., polyethylene naphthalate and polybutylene naphthalate); linear polyesters, such as polytetramethylene terephthalate; and degradable aliphatic polyesters, such as polyhydroxy butyrate, polycaprolactone, polybutylene succinate, polyethylene succinate, polylactic acid, polymalic acid, polyglycolic acid, polydioxane, and poly(2-oxetanone).

Examples of the polyether-based resin include polyacetal, polyphenylene ether, polyether ketone, polyether ether ketone, polyether ketone ketone, polyether ether ketone ketone, polyether sulfone, and polyether imide.

Examples of the polycarbonate-based resin include polycarbonates, polycarbonate/ABS resins, polycarbonate/ASA resins, polycarbonate/AES resins, and branched polycarbonates.

Examples of the polyamide-based resin include polymers of s-caprolactam (nylon 6), undecane lactam (nylon 11), lauryl lactam (nylon 12), aminocaproic acid, enantholactam, 7-aminoheptanoic acid, 11-aminoundecanoic acid, 9-aminononanoic acid, α-pyrrolidone, α-piperidone and the like; copolymers obtained by copolymerization of a diamine (e.g., hexamethylenediamine, nonanediamine, nonanemethylenediamine, methylpentadiamine, undecanemethylenediamine, dodecanemethylenediamine, or m-xylenediamine) and a carboxylic acid compound (e.g., a dicarboxylic acid, such as adipic acid, sebacic acid, terephthalic acid, isophthalic acid, dodecanedicarboxylic acid or glutaric acid); and mixtures of these polymers and/or copolymers. Examples of the polyamide-based resin also include aramid resins such as "KEVLAR®" (trade name) manufactured by DuPont, "NOMEX®" (trade name) manufactured by DuPont, and "TWARON®" (trade name) and "CONEX" (trade name) which are manufactured by TEJIN Ltd.

Examples of the halogen-containing resin include polyvinyl chloride, polyvinylidene chlorides, chlorinated polyethylenes, chlorinated polypropylenes, polyvinylidene fluorides, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers, and vinyl chloride-cyclohexylmaleimide copolymers.

Examples of the thermoplastic resin also include petroleum resins, coumarone resins, polyvinyl acetates, acrylic resins, polymethyl methacrylates, polyvinyl alcohols, polyvinyl formals, polyvinyl butyrals, polyphenylene sulfides, polyurethanes, cellulose-based resins, polyimide resins, polysulfones, liquid crystal polymers, and blends of these thermoplastic resins.

Further, the thermoplastic resin may be an elastomer, such as an isoprene rubber, a butadiene rubber, an acrylonitrile-butadiene copolymer rubber, a styrene-butadiene copolymer rubber, a fluorocarbon rubber, a silicone rubber, a polyester-based elastomer, a nitrile-based elastomer, a nylon-based elastomer, a vinyl chloride-based elastomer, a polyamide-based elastomer or a polyurethane-based elastomer, or a combination of these elastomers.

In the resin composition of the present invention, these thermoplastic resins may be used individually, or two or more thereof may be used in combination. Further, these thermoplastic resins may be alloyed as well. These thermoplastic resins can be used regardless of, for example, molecular weight, polymerization degree, density, softening point, insoluble component-to-solvent ratio, degree of stereoregularity, presence or absence of catalyst residue, type and blend ratio of each material monomer, and type of polymerization catalyst (e.g., a Ziegler catalyst or a metallocene catalyst).

In the thermoplastic resin composition of the present invention, a polyolefin-based resin is preferably used since it makes the effects of the present invention prominent.

A method of blending the components (A), (B) and (C) of the composition of the present invention into a thermoplastic resin is not particularly restricted, and any known resin additive blending technology can be employed. For example, any of a method of dry-blending the thermoplastic resin in a powder or pellet form with the above-described components, a method of adding the components to a polymerization system prior to polymerizing the thermoplastic resin, a method of adding the components in the middle of the polymerization, and a method of adding the components after the polymerization, can be employed. Further, for example, a method of preparing a masterbatch containing any of the components at a high concentration and then adding the masterbatch to the thermoplastic resin, or a method of processing some or all of the components into a pellet form and then adding the pellet to the thermoplastic resin can be employed as well. Still further, any of the components may be impregnated into a filler or the like, or processed into granules, and then incorporated into the thermoplastic resin. Moreover, the components may be blended in advance and then added to the thermoplastic resin, or the components may be separately added to the thermoplastic resin.

As for a method of processing the components of the composition of the present invention into a pellet form, a pellet can be produced by heating a mixture of the composition of the present invention, a phenolic antioxidant, a polymer compound, a binder such as a petroleum resin and, as required, other additive(s) to be optionally incorporated, and subsequently blending the mixture in the presence of the binder in a molten state. The processing conditions, the processing equipment and the like are not restricted at all, and any well-known and commonly-used processing method and processing equipment can be employed. Specific examples of the production method include a disk pelleter method and an extrusion method.

In the thermoplastic resin composition of the present invention, an optional and known additive(s) (e.g., a phenolic antioxidant, a phosphorus-based antioxidant, a thioether-based antioxidant, other antioxidant, an ultraviolet absorber, a hindered amine compound, other nucleating agent different from the component (A), a flame retardant, a flame retardant aid, a lubricant, a filler, a hydrotalcite, an antistatic agent, a fluorescent brightener, a pigment, and a dye)may also be incorporated within a range that does not markedly impair the effects of the present invention.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl) propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N'-hexane-1, 6-diylbis[3-(3,5-di-tert-butyl-4-hydroxyphenyl)propionamide], 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-di-tert-butyl-4-hydroxybenzenepropanoic acid and a C13-15 alkyl, 2,5-di-tert-amylhydroquinone, hindered phenol polymers (e.g., trade name "AO.OH.98" manufactured by ADEKA Polymer Additives Europe SAS), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][J1,3,2]-dio xaphosphepin, hexamethylene-bis[3-(3,5-di-tert-butyl-4-hydroxyphenyl)propionate, calcium bis[monoethyl(3,5-di-tert-butyl-4-hydroxybenzyl)phosphonate], a reaction product between 5,7-bis(1,1-dimethylethyl)-3-hydroxy-2(3H)-benzofuranone and o-xylene, 2,6-di-tert-butyl-4-(4,6-bis(octylthio)-1, 3,5-triazine-2-ylamino)phenol, DL-α-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2, 4,6-trimethylbenzene, 1,3,5-tris[[3,5-di-tert-butyl-4-hydroxyphenyl)propionyloxyethyl]isocyanurate, tetrakis[methylene-3-(3',5'-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-t etraoxaspiro[5.5]undecane, triethylene glycol-bis [β-(3-tert-butyl-4-hydroxy-5-methylphenyl)propionate],
and 3-(3,5-dialkyl-4-hydroxyphenyl)propionic acid derivatives, such as stearyl-3-(3,5-di-tert-butyl-4-hydroxyphenyl) propionic acid amide, palmityl-3-(3,5-di-tert-butyl-4-hydroxyphenyl)propionic acid amide, myristyl-3-(3,5-di-tert-butyl-4-hydroxyphenyl)propionic acid amide and lauryl-3-(3,5-di-tert-butyl-4-hydroxyphenyl)propionic acid amide. When a phenolic antioxidant is incorporated, the amount thereof is preferably 0.001 to 5 parts by mass, more preferably 0.03 to 3 parts by mass, with respect to 100 parts by mass of the thermoplastic resin.

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, dioleyl hydrogen phosphite, trilauryl trithiophosphite, bis(tridecyl)phosphite, tris(isodecyl)phosphite, tris(tridecyl)phosphite, diphenyldecyl phosphite, dinonylphenyl-bis(nonylphenyl)phosphite, poly(dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, mixtures of distearyl pentaerythritol and calcium stearate, alkyl(C10) bis-phenol-A phosphite, tetraphenyl-tetra(tridecyl)pentaerythritol tetraphosphite, bis(2,4-di-tert-butyl-6-methylphenyl) ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phospha-phenanthrene-10-oxide, (1-methyl-1-propanyl-3-ylidene) tris(1,1-dimethylethyl)-5-methyl-4,1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl)phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, bis(diisodecyl)pentaerythritol diphosphite, bis(tridecyl)pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite, bis(2,4,6-tri-tert-butylphenyl)pentaerythritol diphosphite, bis(2,6-di-tert-butyl-4-methylphenyl)pentaerythritol diphosphite, and bis(2,4-dicumylphenyl)pentaerythritol diphosphite. When a phosphorus-based antioxidant is incorporated, the amount thereof is preferably 0.001 to 10 parts by mass, more preferably 0.01 to 0.5 parts by mass, with respect to 100 parts by mass of the thermoplastic resin.

Examples of the thioether-based antioxidant include tetrakis[methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis (6-tert-butyl-p-cresol), and distearyl disulfide. When a thioether-based antioxidant is incorporated, the amount thereof is preferably 0.001 to 10 parts by mass, more preferably 0.01 to 0.5 parts by mass, with respect to 100 parts by mass of the thermoplastic resin.

Examples of the ultraviolet absorber include 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy) benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine; and a variety of metal salts and metal chelates, particularly salts and chelates of nickel and chromium. When an ultraviolet absorber is incorporated, the amount thereof is preferably 0.001 to 10 parts by mass, more preferably 0.01 to 0.5 parts by mass, with respect to 100 parts by mass of the thermoplastic resin.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6- tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl)piperidyl}decanedionate, and bis{4-(2,2,6,6-tetramethyl-1-undecyloxy)piperidyl)carbonate. When a hindered amine compound is incorporated, the amount thereof is preferably 0.001 to 10 parts by mass, more preferably 0.01 to 0.5 parts by mass, with respect to 100 parts by mass of the thermoplastic resin.

Examples of other nucleating agent different from the component (A) include metal carboxylates, such as sodium-2,2'-methylene-bis(4,6-di-tert-butylphenyl)phosphate, lithium-2,2'-methylene-bis(4,6-di-tert-butylphenyl)phosphate, 4-tert-butylbenzoate aluminum salt, and 2-sodium bicyclo[2.2.1]heptane-2,3-dicarboxylate; polyol derivatives, such as dibenzylidene sorbitol, bis(methylbenzylidene)sorbitol, bis(3,4-dimethylbenzylidene)sorbitol, bis(p-ethylbenzylidene)sorbitol, and bis(dimethylbenzylidene)sorbitol; and amide compounds, such as N,N',N"-tris[2-methylcyclohexyl]-1,2,3-propane tricarboxamide, N,N',N'''-tricyclohexyl-1,3,5-benzene tricarboxamide, N,N-dicyclohexylnaphthalene dicarboxamide, and 1,3,5-tri(dimethylisopropoylamino)benzene. When other nucleating agent is incorporated, a total amount of the component (A) and the other nucleating agent is preferably 0.001 to 10 parts by mass, more preferably 0.01 to 5 parts by mass, with respect to 100 parts by mass of the thermoplastic resin. The composition of the present invention preferably contains neither a polyol derivative nor an amide compound, more preferably contains no other nucleating agent.

Examples of the flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylenetetraphenyldiphosphate, and 1,3-phenylene-tetrakis(2,6-dimethylphenyl)phosphate, as well as "ADK STAB FP-500", "ADK STAB FP-600" and "ADK STAB FP-800" (trade names, manufactured by ADEKA Corporation); phosphonates, such as divinyl phenylphosphonate, diallyl phenylphosphonate, and (1-butenyl)phenylphosphonate; phosphinates, such as phenyl diphenylphosphinate, methyl diphenylphosphinate, and 9,10-dihydro-9-oxa-10-phosphaphenanthlene-10-oxide derivatives; phosphazene compounds, such as bis(2-allylphenoxy)phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with a drip inhibitor such as a fluorocarbon resin, and/or a flame retardant aid such as a polyhydric alcohol or hydrotalcite. When a flame retardant is incorporated, the amount thereof is preferably 1 to 100 parts by mass, more preferably 10 to 70 parts by mass, with respect to 100 parts by mass of the thermoplastic resin.

The above-described hydrotalcite is a complex salt compound which is known as a natural or synthetic product and composed of magnesium, aluminum, hydroxy groups, a carbonate group and arbitrary crystal water, and examples thereof include hydrotalcites in which some of the magnesium or aluminum atoms are substituted with other metal such as an alkali metal or zinc; and hydrotalcites in which the hydroxy group(s) and/or carbonate group is/are substituted with other anionic group(s), specifically hydrotalcites represented by Formula (3) below in which a metal is substituted with an alkali metal. In addition, as an Al—Li hydrotalcite, a compound represented by Formula (4) below can be used as well.

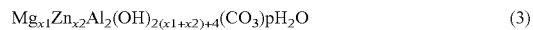

$$Mg_{x1}Zn_{x2}Al_2(OH)_{2(x1+x2)+4}(CO_3)pH_2O \qquad (3)$$

wherein x1 and x2 each represent a number that satisfies the conditions represented by the following equations; and p represents 0 or a positive number: $0 \leq x2/x1 < 10$, $2 \leq (x1+x2) \leq 20$.

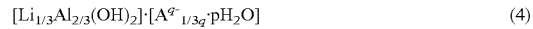

$$[Li_{1/3}Al_{2/3}(OH)_2] \cdot [A^{q-}{}_{1/3q} \cdot pH_2O] \qquad (4)$$

wherein $A^{q-}$ represents an anion having a valence of q; and p represents 0 or a positive number.

Further, the carbonate anions in these hydrotalcites may be partially substituted with other anions.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcite may be a naturally-occurring or synthetic hydrotalcite. Examples of a synthesis method thereof include known methods that are described in JPS46-2280B, JPS50-30039B1, JPS51-29129B1, JPH03-36839B2, JPS61-174270A, JPH05-179052A and the like. Further, the above-exemplified hydrotalcites can be used without any restriction in terms of crystal structure, crystal particles and the like. When a hydrotalcite is incorporated, the amount thereof is preferably 0.001 to 5 parts by mass, more preferably 0.01 to 3 parts by mass, with respect to 100 parts by mass of the thermoplastic resin.

The lubricant is added for the purposes of imparting the surface of the resulting molded article with lubricity and improving the damage-preventing effect. Examples of the lubricant include unsaturated fatty acid amides, such as oleic acid amide and erucic acid amide; saturated fatty acid amides, such as behenic acid amide and stearic acid amide; butyl stearate; stearyl alcohols; stearic acid monoglyceride; sorbitan monopalmitate; sorbitan monostearate; mannitol; stearic acid; hardened castor oil; stearic acid amide; oleic acid amide; and ethylene-bis stearic acid amide. These lubricants may be used individually, or two or more thereof may be used in combination. When a lubricant is incorporated, the amount thereof is preferably 0.01 to 2 parts by mass, more preferably 0.03 to 0.5 parts by mass, with respect to 100 parts by mass of the thermoplastic resin.

Examples of the antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents, such as polyhydric alcohol fatty acid esters, polyglycol phosphates, and polyoxyethylene alkyl allyl ethers; amphoteric antistatic agents, such as amphoteric alkyl betaines (e.g., alkyldimethylamino acetic acid betaines) and imidazoline-type amphoteric activators; and polymer-type antistatic agents, such as polyether ester amides. These antistatic agents may be used individually, or two or more thereof may be used in combination. When an antistatic agent is incorporated, the amount thereof is preferably 0.03 to 2 parts by mass, more preferably 0.1 to 0.8 parts by mass, with respect to 100 parts by mass of the thermoplastic resin.

The fluorescent brightener is a compound which enhances the whiteness or blueness of a molded article by a fluorescent action of absorbing ultraviolet rays of solar light and artificial light, converting the absorbed ultraviolet rays into visible light of purple to blue and radiating the visible light. Examples of the fluorescent brightener include C.I. Fluorescent Brightener 184, which is a benzoxazole-based compound; C.I. Fluorescent Brightener 52, which is a coumarin-based compound; and C.I. Fluorescent Brighteners 24, 85 and 71, which are diaminostyrylbenzyl sulfone-based compounds. When a fluorescent brightener is used, the amount thereof is preferably 0.00001 to 0.1 parts by mass, more preferably 0.00005 to 0.05 parts by mass, with respect to 100 parts by mass of the thermoplastic resin.

As the above-described pigment, a commercially available pigment can be used as well, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65, and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 29, 56, 60, 61, 62, and 64; and PIGMENT VIOLET 1, 15, 19, 23, 27, 29, 30, 32, 37, 40, and 50.

Examples of the dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be mixed and used in combination.

The molded article of the present invention is obtained by molding the thermoplastic resin composition of the present invention. The thermoplastic resin composition of the present invention can be molded by any known molding method. The molded article can be obtained by, for example, injection molding, extrusion molding, blow molding, vacuum molding, inflation molding, calender molding, slush molding, dip molding, or foam molding.

Examples of the use of the thermoplastic resin composition of the present invention include automobile materials, such as bumpers, dash boards, and instrument panels; housing applications, such as refrigerators, laundry machines, and vacuum cleaners; household articles, such as tableware, buckets, and bath goods; miscellaneous goods, such as toys; molded articles, including storage/preservation containers such as tanks; films; and fibers.

EXAMPLES

The present invention will now be described more concretely by way of Examples thereof; however, the present invention is not restricted to Examples below and the like by any means.

Examples 1-1 to 1-11 and Comparative Examples 1-1 to 1-16

To a homopolypropylene as a thermoplastic resin (melt flow rate: 8 g/10 min; 2.16 kg×230° C. according to ISO Standard 1133) in an amount of 100 parts by mass, 0.05 parts by mass of a phenolic antioxidant (tetrakis[methylene-3-(3', 5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of a hydrotalcite (trade name "DHT-4A", manufactured by Kyowa Chemical Industry Co., Ltd.) and each composition shown in Tables 1 to 3 were added, and these materials were mixed at 1,000 rpm for 1 minute using a Henschel mixer and subsequently granulated at an extrusion temperature of 230° C. using a biaxial extruder. The thus granulated pellets were each dried at 60° C. for 8 hours, after which the haze was measured under the below-described conditions. The results thereof are shown in Tables 1 to 3. It is noted here that, in Tables 1 to 3, the unit of the amount of each component is parts by mass.

Example 2-1 and Comparative Examples 2-1 and 2-2

To a homopolypropylene as a thermoplastic resin (melt flow rate: 8 g/10 min; 2.16 kg×230° C. according to ISO Standard 1133) in an amount of 100 parts by mass, 0.05 parts by mass of a phenolic antioxidant (tetrakis[methylene-3-(3', 5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate and each composition shown in Table 4 were added, and these materials were mixed at 1,000 rpm for 1 minute using a Henschel mixer and subsequently granulated at an extrusion temperature of 230° C. using a biaxial extruder. The thus granulated pellets were each dried at 60° C. for 8 hours, after which the haze was measured under the below-described conditions. The results thereof are shown in Table 4. It is noted here that, in Table 4, the unit of the amount of each component is parts by mass.

Examples 3-1 to 3-9 and Comparative Examples 3-1 to 3-7

To a homopolypropylene as a thermoplastic resin (melt flow rate: 8 g/10 min; 2.16 kg×230° C. according to ISO Standard 1133) in an amount of 100 parts by mass, 0.05 parts by mass of a phenolic antioxidant (tetrakis[methylene-3-(3', 5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of a hydrotalcite (trade name "DHT-4A", manufactured by Kyowa Chemical Industry Co., Ltd.) and each composition shown in Tables 5 and 6 were added, and these materials were mixed at 1,000 rpm for 1 minute using a Henschel mixer and subsequently granulated at an extrusion temperature of 230° C. using a biaxial extruder. The thus granulated pellets were each dried at 60° C. for 8 hours, after which the crystallization temperature, the half-crystallization time and the bending elastic modulus were measured under the below-described conditions. The results thereof are shown in Tables 5 and 6. It is noted here that, in Tables 5 and 6, the unit of the amount of each component is parts by mass.

Examples 4-1 to 4-3 and Comparative Examples 4-1 to 4-5

To a homopolypropylene as a thermoplastic resin (melt flow rate: 8 g/10 min; 2.16 kg×230° C. according to ISO Standard 1133) in an amount of 100 parts by mass, 0.05 parts by mass of a phenolic antioxidant (tetrakis[methylene-3-(3', 5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate and each composition shown in Table 7 were added, and these materials were mixed at 1,000 rpm for 1 minute using a Henschel mixer and subsequently granulated at an extrusion temperature of 230° C. using a biaxial extruder. The thus granulated pellets were each dried at 60° C. for 8 hours, after which the haze, the heat deflection temperature under load (HDT), the crystallization temperature, the half crystallization time and the bending elastic modulus were measured under the below-described conditions. The results thereof are shown in Table 7. It is noted here that, in Table 7, the unit of the amount of each component is parts by mass.

<Haze>

Using an injection molding machine (EC100-2A, manufactured by Toshiba Machine Co., Ltd.), the above-obtained pellets were each injection-molded at a mold temperature of 50° C. and a resin temperature of 200° C. to prepare test pieces. In Examples 1-1 to 1-11, Comparative Examples 1-1 to 1-16, Example 2-1 and Comparative Examples 2-1 and 2-2, the test pieces were prepared at dimensions of 60 mm×60 mm×1 mm and, in Example 2-1, Comparative Examples 2-1 and 2-2, Examples 4-1 to 4-3 and Comparative Examples 4-1 to 4-5, the test pieces were prepared at dimensions of 60 mm×60 mm×2 mm. Immediately after being molded, the test pieces were left to stand in a 23° C. incubator for at least 48 hours, followed by measurement of the haze (%)using Haze Guard II (manufactured by BYK Additives & Instruments, Ltd.) in accordance with ISO14782.

<Crystallization Temperature>

A small piece was cut out from each of the above-obtained pellets, and the crystallization temperature thereof was measured using a differential scanning calorimeter (DIAMOND, manufactured by PerkinElmer Co., Ltd.). For the measurement, in a chart obtained by heating the piece from room temperature to 230° C. at a rate of 50° C./min, maintaining the piece for 10 minutes and then cooling the piece to 50° C. at a rate of −10° C./min, the temperature at which an endothermic reaction formed a peak top was defined as the crystallization temperature.

<Half Crystallization Time>

A small piece was cut out from each of the above-obtained pellets and, using a differential scanning calorimeter (DIAMOND, manufactured by PerkinElmer Co., Ltd.), the thus obtained piece was heated to 230° C. at a rate of 50° C./min, maintained for 10 minutes, and then cooled to 135° C. at a rate of −200° C./min. After the temperature was decreased to 135° C., this temperature was maintained for 15 minutes, and the time required for the amount of endothermic enthalpy necessary for crystallization to be reduced to half was determined, and defined as the half-crystallization time.

<Bending Elastic Modulus (MPa)>

Using an injection molding machine (EC100-2A, manufactured by Toshiba Machine Co., Ltd.), the above-obtained pellets were each injection-molded at a mold temperature of 50° C. and a resin temperature of 200° C. to prepare test pieces having dimensions of 80 mm×10 mm×4 mm and, after leaving the thus obtained test pieces to stand for at least 48 hours in a 23° C. incubator, the bending elastic modulus (MPa) was measured in accordance with ISO178 using a bending tester "AG-IS" manufactured by Shimadzu Corporation.

<Deflection Temperature under Load (° C.)>

Using an injection molding machine (EC100-2A, manufactured by Toshiba Machine Co., Ltd.), the above-obtained pellets were each injection-molded at a mold temperature of 50° C. and a resin temperature of 200° C. to prepare test pieces having dimensions of 80 mm×10 mm×4 mm and, after leaving the thus obtained test pieces to stand for at least 48 hours in a 23° C. incubator, the deflection temperature under load (° C.) of each test piece was measured in accordance with ISO75 (load: 1.8 MPa).

TABLE 1

| | Example 1-1 | Example 1-2 | Example 1-3 | Example 1-4 | Example 1-5 | Example 1-6 | Example 1-7 | Example 1-8 | Example 1-9 | Example 1-10 | Example 1-11 |
|---|---|---|---|---|---|---|---|---|---|---|---|
| (A)-1 | 0.072 | 0.070 | 0.067 | 0.065 | 0.065 | 0.063 | 0.067 | 0.067 | 0.067 | 0.067 | 0.067 |
| (B)-1 | 0.014 | 0.015 | 0.017 | 0.018 | 0.014 | 0.019 | 0.020 | 0.023 | 0.012 | 0.009 | 0.007 |
| (C)-1 | 0.014 | 0.015 | 0.017 | 0.018 | 0.021 | 0.019 | 0.013 | 0.010 | 0.021 | 0.024 | 0.026 |
| (C)/(B) (molar ratio) | 1.31 | 1.31 | 1.31 | 1.31 | 1.96 | 1.31 | 0.85 | 0.57 | 2.29 | 3.49 | 4.86 |
| (A)/{(B) + (C)} (molar ratio) | 0.67 | 0.61 | 0.52 | 0.47 | 0.47 | 0.43 | 0.55 | 0.56 | 0.51 | 0.50 | 0.49 |
| Haze (%)/1 mm | 16.9 | 16.6 | 16.3 | 16.2 | 16.9 | 16.6 | 16.4 | 16.8 | 17.5 | 17.6 | 17.8 |

(A)-1: aluminum hydroxybis[2,2'-methylene-bis(4,6-di-tert-butylphenyl)phosphate] (molecular weight: 1,015.23)

(B)-1: sodium stearate (molecular weight: 306.46)

(C)-1: lithium myristate (molecular weight: 234.304)

TABLE 2

|  | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 |
|---|---|---|---|---|---|---|---|---|
| (A)-1 | 0.072 | 0.070 | 0.067 | 0.063 | 0.060 | 0.055 | 0.072 | 0.070 |
| (B)-1 | — | — | — | — | — | — | 0.028 | 0.030 |
| (C)-1 | 0.028 | 0.030 | 0.033 | 0.037 | 0.040 | 0.045 | — | — |
| (C)/(B) (molar ratio) | — | — | — | — | — | — | — | — |
| (A)/{(B) + (C)} (molar ratio) | 0.59 | 0.54 | 0.47 | 0.39 | 0.35 | 0.28 | 0.78 | 0.70 |
| Haze (%)/1 mm | 20.9 | 19.4 | 18.3 | 18.0 | 17.9 | 17.8 | 20.8 | 17.9 |

TABLE 3

|  | Comparative Example 1-9 | Comparative Example 1-10 | Comparative Example 1-11 | Comparative Example 1-12 | Comparative Example 1-13 | Comparative Example 1-14 | Comparative Example 1-15 | Comparative Example 1-16 |
|---|---|---|---|---|---|---|---|---|
| (A)-1 | 0.067 | 0.065 | 0.063 | 0.060 | 0.055 | 0.080 | 0.067 | 0.067 |
| (B)-1 | 0.033 | 0.035 | 0.037 | 0.040 | 0.045 | 0.004 | 0.003 | 0.030 |
| (C)-1 | — | — | — | — | — | 0.016 | 0.030 | 0.003 |
| (C)/(B) (molar ratio) | — | — | — | — | — | 5.23 | 13.08 | 0.13 |
| (A)/{(B) + (C)} (molar ratio) | 0.61 | 0.56 | 0.51 | 0.45 | 0.37 | 0.97 | 0.48 | 0.60 |
| Haze (%)/1 mm | 18.1 | 17.9 | 17.9 | 19.2 | 22.9 | 19.9 | 18.2 | 18.1 |

TABLE 4

|  | Example 2-1 | Comparative Example 2-1 | Comparative Example 2-2 |
|---|---|---|---|
| (A)-1 | 0.067 | 0.067 | 0.067 |
| (B)-1 | 0.017 | 0.033 | — |
| (C)-1 | 0.017 | — | 0.033 |
| (C)/(B) (molar ratio) | 1.31 | — | — |
| (A)/{(B) + (C)} (molar ratio) | 0.52 | 0.61 | 0.47 |
| Haze (%)/1 mm | 19.0 | 19.2 | 21.9 |
| Haze (%)/2 mm | 49 | 53 | 50 |

TABLE 5

|  | Example 3-1 | Example 3-2 | Example 3-3 | Example 3-4 | Example 3-5 | Example 3-6 | Example 3-7 | Example 3-8 | Example 3-9 |
|---|---|---|---|---|---|---|---|---|---|
| (A)-1 | 0.067 | 0.067 | 0.067 | 0.067 | 0.065 | 0.063 | 0.050 | 0.040 | 0.066 |
| (B)-1 | 0.017 | 0.017 | 0.020 | 0.026 | 0.021 | 0.023 | 0.025 | 0.030 | 0.013 |
| (C)-1 | — | — | 0.013 | 0.007 | 0.014 | 0.015 | 0.025 | 0.030 | 0.010 |
| (C)-2 | 0.017 | — | — | — | — | — | — | — | — |
| (C)-3 | — | 0.017 | — | — | — | — | — | — | 0.011 |
| Zn-St | — | — | — | — | — | — | — | — | — |
| Mg-St | — | — | — | — | — | — | — | — | — |
| (C)/(B) (molar ratio) | 0.95 | 1.15 | 0.85 | 0.35 | 0.87 | 0.85 | 1.31 | 1.31 | 2.46 |
| (A)/{(B) + (C)} (molar ratio) | 0.61 | 0.55 | 0.55 | 0.58 | 0.50 | 0.45 | 0.26 | 0.17 | 0.51 |
| Crystallization temperature (° C.) | 132.1 | 132.3 | 130.2 | 130.6 | 130.5 | 130.7 | 130.1 | 129.7 | 130.6 |
| Half crystallization time (seconds) | 46 | 43 | 60 | 57 | 56 | 53 | 61 | 68 | 56 |
| Bending elastic modulus (MPa) | 1,930 | 1,920 | 1,910 | 1,920 | 1,920 | 1,950 | 1,950 | 1,930 | 1,930 |

(C)-2: potassium stearate (molecular weight: 322.57)

(C)-3: potassium myristate (molecular weight: 266.46)

Zn-St: zinc stearate

Mg-St: magnesium stearate

TABLE 6

|  | Comparative Example 3-1 | Comparative Example 3-2 | Comparative Example 3-3 | Comparative Example 3-4 | Comparative Example 3-5 | Comparative Example 3-6 | Comparative Example 3-7 |
|---|---|---|---|---|---|---|---|
| (A)-1 | 0.067 | 0.067 | 0.067 | 0.067 | 0.067 | 0.067 | 0.063 |
| (B)-1 | 0.017 | — | — | — | — | — | — |
| (C)-1 | — | 0.017 | 0.017 | — | — | — | 0.037 |
| (C)-2 | — | — | — | — | — | — | — |
| (C)-3 | — | — | — | 0.034 | 0.017 | 0.17 | — |
| Zn-St | — | 0.017 | — | — | 0.017 | — | — |
| Mg-St | 0.017 | - | 0.017 | — | — | 0.017 | — |
| (C)/(B) (molar ratio) | — | — | — | — | — | — | — |
| (A)/{(B) + (C)} (molar ratio) | 1.19 | 0.91 | 0.91 | 0.52 | 1.03 | 1.03 | 0.39 |
| Crystallization temperature (° C.) | 129.4 | 125.5 | 123.6 | 127.7 | 128.4 | 128.2 | 126.6 |
| Half crystallization time (seconds) | 77 | 198 | 398 | 93 | 81 | 87 | 143 |
| Bending elastic modulus (MPa) | 1,840 | 1,670 | 1,610 | 1,860 | 1,770 | 1,750 | 1,730 |

TABLE 7

|  | Example 4-1 | Example 4-2 | Example 4-3 | Comparative Example 4-1 | Comparative Example 4-2 | Comparative Example 4-3 | Comparative Example 4-4 | Comparative Example 4-5 |
|---|---|---|---|---|---|---|---|---|
| (A)-1 | 0.050 | 0.071 | 0.045 | — | 0.082 | 0.048 | 0.060 | — |
| (B)-2 | 0.031 | 0.012 | 0.028 | — | 0.002 | 0.052 | — | 0.100 |
| (C)-1 | 0.019 | 0.017 | 0.015 | — | 0.016 | — | 0.040 | — |
| Stearic acid | — | — | 0.012 | — | — | — | — | — |
| (C)/(B) (molar ratio) | 0.38 | 0.85 | 0.70 | — | 5.23 | — | — | — |
| (A)/(B) + (C) (molar ratio) | 0.17 | 0.45 | 0.29 | — | 0.97 | 0.13 | 0.35 | — |
| Haze (%)/2 mm | 54.2 | 49.9 | 61.6 | 85.1 | 61.8 | 64.3 | 50.3 | 65.3 |
| HDT (° C.) | 116.2 | 111.4 | 116.2 | 82.0 | 103.9 | 114.8 | 107.1 | 109.7 |
| Crystallization temperature (° C.) | 130.5 | 130.4 | 130.7 | 113.4 | 126.8 | 130.7 | 128.1 | 130.8 |
| Half crystallization time (seconds) | 60 | 58 | 59 | 900< | 119 | 58 | 89 | 58 |
| Bending elastic modulus (MPa) | 2,000 | 1,910 | 2,020 | 1,380 | 1,720 | 1,950 | 1,820 | 1,860 |

According to Comparative Examples 1-1 to 1-6 where a composition composed of a combination of the components (A) and (C) was used and Comparative Examples 1-7 to 1-13 where a composition composed of the components (A) and (B) was used, the molded articles did not have satisfactory transparency. In addition, according to Comparative Examples 1-14 to 1-16 where a composition in which the ratio (C)/(B) was outside the range of 0.30 to 5.00 was used, none of the molded articles had satisfactory transparency.

As compared to the molded articles of Comparative Examples 1-3, 1-9, 1-15 and 1-16 that were obtained using a composition containing the component (B) and/or the component (C) in a total amount of 0.033 parts by mass with respect to 0.067 parts by mass of the component (A), it was confirmed that those molded article of Examples 1-3 and 1-7 to 1-11, which were obtained using the composition of the present invention that had the same amount of the component (A) and a total amount of the components (B) and (C) of 0.033 parts by mass, were provided with excellent transparency.

According to the results of Comparative Examples 3-1 to 3-7 shown in Table 6, the molded articles obtained using a composition different from the composition of the present invention did not exhibit a satisfactory improvement effect in terms of physical properties. On the other hand, according to the results of Examples 3-1 to 3-9 shown in Table 5, the molded articles obtained using the composition of the present invention attained an excellent effect of improving the physical properties. Particularly, according to Examples 3-1 to 3-7, the half-crystallization time was greatly shortened and a prominent crystallization-promoting effect was attained in those molded articles that were obtained using a composition in which the ratio (A)/{(B)+(C)} was in a range of 0.25 to 0.65. It was confirmed that the molded articles exhibited excellent physical properties also in those cases where a composition containing a lithium salt compound or a potassium salt compound in combination as the component (C) was used.

From the results of Comparative Example 4-2 shown in Table 7, it was confirmed that a composition different from the composition of the present invention had a poor effect of improving the physical properties even though the composition contained the components (A), (B) and (C). From Comparative Examples 4-3 to 4-5, it was confirmed that the use of a composition deficient in any one of the components (A), (B) and (C) had a poor transparency-improving effect. In contrast, according to the results of Examples 4-1 and 4-2 shown in Table 7, it was confirmed that, when the composition of the present invention was used, the resulting molded articles showed an excellent crystallization-promoting effect, and not only a prominent effect of improving the transparency and physical properties but also excellent promotion of crystallization were exerted.

According to the above, the composition of the present invention provides a composition that can greatly improve the physical properties and transparency of a thermoplastic resin.

The invention claimed is:

1. A composition comprising:
(A) a cyclic organophosphate aluminum salt;
(B) a sodium carboxylate; and
(C) a fatty acid metal salt,
wherein the (A) cyclic organophosphate aluminum salt is aluminum hydroxybis[2,2'-methylene-bis(4,6-di-tert-butylphenyl)phosphate],
wherein the (B) sodium carboxylate is at least one selected from the group consisting of a sodium aromatic carboxylate and a sodium-fatty acid having 10 to 21 carbon atoms,
wherein the (C) fatty acid metal salt is represented by the following Formula (2):

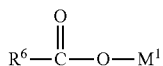

(2)

wherein $R^6$ represents a group which is introduced to an aliphatic organic acid having 10 to 30 carbon atoms, and $M^1$ represents lithium or potassium, wherein a molar ratio of the (C) fatty acid metal salt to the (B) sodium carboxylate, (C)/(B), is in a range of 0.30 to 5.00, wherein a molar ratio of the (A) cyclic organophosphate aluminum salt to the (B) sodium carboxylate and the (C) fatty acid metal salt, (A)/{(B)+(C)}, is in a range of 0.15 to 0.70; and wherein the composition comprises 40% by mass or more of the (A) cyclic organophosphate aluminum salt.

2. The composition according to claim 1, wherein the (B) sodium carboxylate is at least one selected from the group consisting of a sodium aromatic carboxylate, a sodium laurate, a sodium myristate, a sodium palmitate, a sodium stearate, a sodium 12-hydroxystearate, a sodium oleate and a sodium linoleate.

* * * * *